United States Patent
Fujisawa et al.

(10) Patent No.: US 12,337,403 B2
(45) Date of Patent: Jun. 24, 2025

(54) CHANGE DEVICE, FINE HOLE ELECTRIC DISCHARGE MACHINE AND ELECTRODE CHANGE METHOD

(71) Applicant: Sodick Co., Ltd., Kanagawa (JP)

(72) Inventors: Yasuhiko Fujisawa, Yokohama (JP); Yuzo Dohi, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 889 days.

(21) Appl. No.: 17/484,237

(22) Filed: Sep. 24, 2021

(65) Prior Publication Data
US 2022/0111455 A1 Apr. 14, 2022

(30) Foreign Application Priority Data
Oct. 9, 2020 (CN) .................. 202011071849.X

(51) Int. Cl.
*B23H 7/26* (2006.01)
*B23H 9/14* (2006.01)
(Continued)

(52) U.S. Cl.
CPC .............. *B23H 7/265* (2013.01); *B23H 9/14* (2013.01); *B23H 11/00* (2013.01); *B23Q 3/15526* (2013.01)

(58) Field of Classification Search
CPC .......... B23H 11/00; B23H 7/265; B23H 9/14; B23Q 3/15526
(Continued)

(56) References Cited

U.S. PATENT DOCUMENTS 9,314,860 B1 * 4/2016 Izworski ................ B23H 11/00
10,391,571 B2 * 8/2019 Hiraga ..................... B23H 7/10
(Continued)

FOREIGN PATENT DOCUMENTS

CN 2715903 Y 8/2005
CN 101132879 A 2/2008
(Continued)

OTHER PUBLICATIONS

Combined Search and Examination Report issued on Mar. 14, 2022, in connection with corresponding British Application No. GB2113593.4; 2 pages.
(Continued)

*Primary Examiner* — Ibrahime A Abraham
*Assistant Examiner* — Adam M Eckardt
(74) *Attorney, Agent, or Firm* — Maier & Maier, PLLC

(57) ABSTRACT

A change device, a fine hole electric discharge machine, and an electrode change method that enable automatic and continuous machining of a large number of holes using electrodes of different diameters. A fine hole electric discharge machine including automatic electrode supply devices and a first change device is provided. The automatic electrode supply device includes an electrode cartridge storing a plurality of electrodes of a predetermined diameter and an electrode feeder device supplying the electrodes one by one from the electrode cartridge. The first change device includes a first magazine accommodating the automatic electrode supply devices in a detachable manner and a first transfer device transferring the automatic electrode supply device between the first magazine and a first chuck on a machining main spindle. The first magazine accommodates a plurality of automatic electrode supply devices storing the electrodes of different diameters.

2 Claims, 15 Drawing Sheets

(51) Int. Cl.
*B23H 11/00* (2006.01)
*B23Q 3/155* (2006.01)

(58) Field of Classification Search
IPC .............. A61K 31/70,36/896; A61P 31/04,
A61P 35/00;
B23H 11/00, 7/26, 9/14; B23Q
3/155; C07J 71/00; C08B 37/00
See application file for complete search history.

(56) References Cited

U.S. PATENT DOCUMENTS

| | | |
|---|---|---|
| 2008/0197115 A1 | 8/2008 | Miyake et al. |
| 2011/0226741 A1* | 9/2011 | Bobeck .............. B23H 7/26 219/69.11 |
| 2018/0050402 A1 | 2/2018 | Nagase |
| 2021/0039181 A1* | 2/2021 | Takahashi .............. B23H 1/04 |
| 2022/0402056 A1* | 12/2022 | Tsuchiya .............. B23H 7/265 |

FOREIGN PATENT DOCUMENTS

| | | |
|---|---|---|
| CN | 107159981 A | 9/2017 |
| CN | 107405708 A | 11/2017 |
| CN | 107614177 A | 1/2018 |
| CN | 208713066 U | 4/2019 |
| CN | 210412927 U | 4/2020 |
| EP | 0248509 A2 | 12/1987 |
| JP | H03-256621 A | 11/1991 |
| JP | 2003-053629 A | 2/2003 |
| JP | 2004-136413 A | 5/2004 |
| JP | 4027770 B2 | 12/2007 |
| JP | 4152602 B2 * | 9/2008 |
| KR | 101876269 B1 | 7/2018 |

OTHER PUBLICATIONS

Office Action issued on Aug. 3, 2021 in corresponding Japanese application No. 2021-079610; 9 pages.
Office Action issued on May 16, 2024, in corresponding Chinese Application No. 202011071849.X, 17 pages.

* cited by examiner

CHANGE DEVICE, FINE HOLE ELECTRIC DISCHARGE MACHINE AND ELECTRODE CHANGE METHOD

FIELD

The present invention relates to a change device of an automatic electrode supply device, a fine hole electric discharge machine for machining a workpiece to form a fine hole, and an electrode change method.

BACKGROUND

In fine hole electric discharge machining, a pipe electrode having a hollow cylindrical shape with an outer diameter of about φ0.5 mm to 3 mm is generally used, and machining is performed while supplying water-based or oil-based machining fluid at high pressure of up to 8 MPa through the hollow portion of the pipe electrode to an electric discharge gap at a tip opening. Since the electrodes used in fine hole electric discharge machining have a small diameter and machining is performed under highly wearing conditions, the electrodes need to be changed one after another according to the degree of wear.

For this reason, when machining a large number of fine holes of a single hold diameter, a fine hole electric discharge machine including an automatic electrode supply device that supplies a new electrode to an electrode holder attached to a tip portion of a machining main spindle and allows the electrode holder to hold the electrode and an electrode collecting device that collects and transfers worn-out electrodes from the electrode holder and automatically accommodates them in a collecting container is widely used.

This automatic electrode supply device includes an electrode cartridge storing a large number of electrodes of a single outer diameter and an electrode feeder device that supplies electrodes one by one from the electrode cartridge through a hollow portion of the machining main spindle to the electrode holder at a tip portion and is attached above the machining main spindle (Patent Literature 1).

On the other hand, when machining of a variety of holes of different diameters, a fine hole electric discharge machine including an electrode holder change device (ATC device) is used to replace the electrode holder attached to an electrode holder chuck at a tip portion of the machining main spindle with another electrode holder. This ATC device includes an electrode holder magazine that accommodates a large number of electrode holders holding electrodes of different outer diameters or different kinds in an individually detachable manner and an electrode holder transfer device that transfers the electrode holder between the electrode holder magazine and the electrode holder chuck. The electrode holders are changed by transferring the electrode holder attached to the electrode holder chuck to the electrode holder magazine by the transfer device, and then selecting the electrode holder holding the electrode of the outer diameter suitable for the hole diameter to be machined and transferring it to the electrode holder chuck by the transfer device. Further, the electrode that is worn out in machining is detached together with the electrode holder by the ATC device and accommodated in the electrode holder magazine (Patent Literature 2).

PATENT LITERATURE

Patent Literature 1: JP-B-4027770
Patent Literature 2: JP-B-4152602

SUMMARY

Since the automatic electrode supply device disclosed in Patent Literature 1 can handle electrodes of only one diameter, it is necessary, when machining with an electrode of a different diameter, to manually replace the automatic electrode supply device with a new one storing electrodes of the diameter. In addition, the electrode holder and a lower guide need to be attached according to the diameter of the electrode. This operation needs to be performed manually or using another device (Patent Literature 2), which makes the operation more complicated and increases the size of the device.

The present invention has been made in view of such circumstances, and the object is to provide a change device, a fine hole electric discharge machine, and an electrode change method that enable continuous machining of a large number of holes using electrodes of different diameters by storing the electrodes in the electrode cartridge.

According to the present application, provided is a first change device including automatic electrode supply devices, a first magazine, and a first transfer device. The first magazine is provided with a plurality of accommodation members including an upper accommodation member, a central accommodation member, and a lower accommodation member and accommodates, in a detachable manner, the automatic electrode supply devices storing the electrodes of different diameters. With such a configuration, the automatic electrode supply devices can be stably accommodated. Further, in a preferred embodiment, provided is a fine hole electric discharge machine including the first change device and change devices accommodating a plurality of electrode holders and lower guides corresponding to the electrode diameters. Since it is possible to automatically change electrodes of various diameters with a single fine hole electric discharge machine, the operation efficiency and application range are dramatically improved.

DETAILED DESCRIPTION (1. 1 Overall Structure of Fine Hole Electric Discharge Machine 100)

Figure 1:
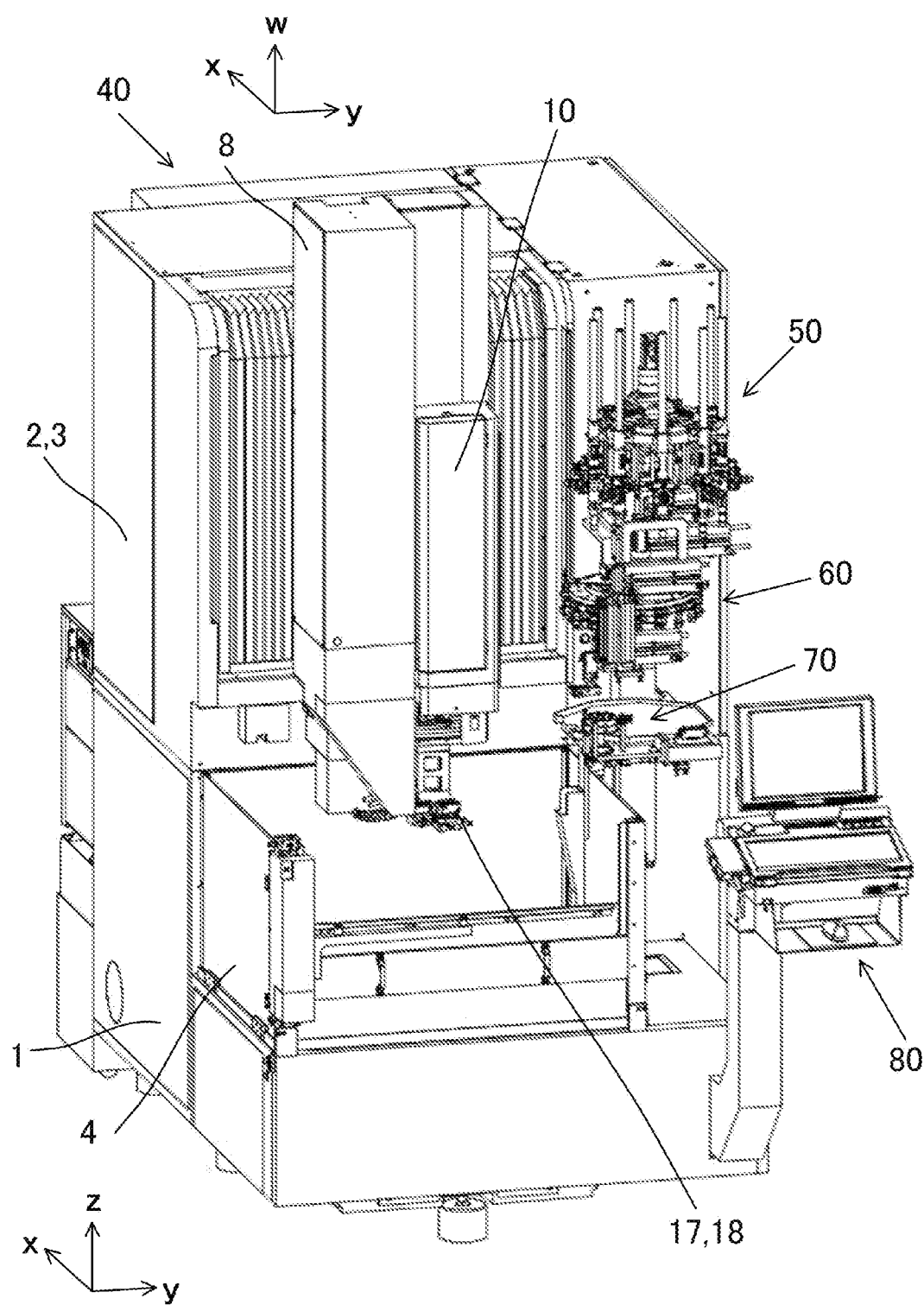
FIG. 1 is a schematic diagram of the overall configuration of a fine hole electric discharge machine 100 of an embodiment of the present invention.
Figure 2:
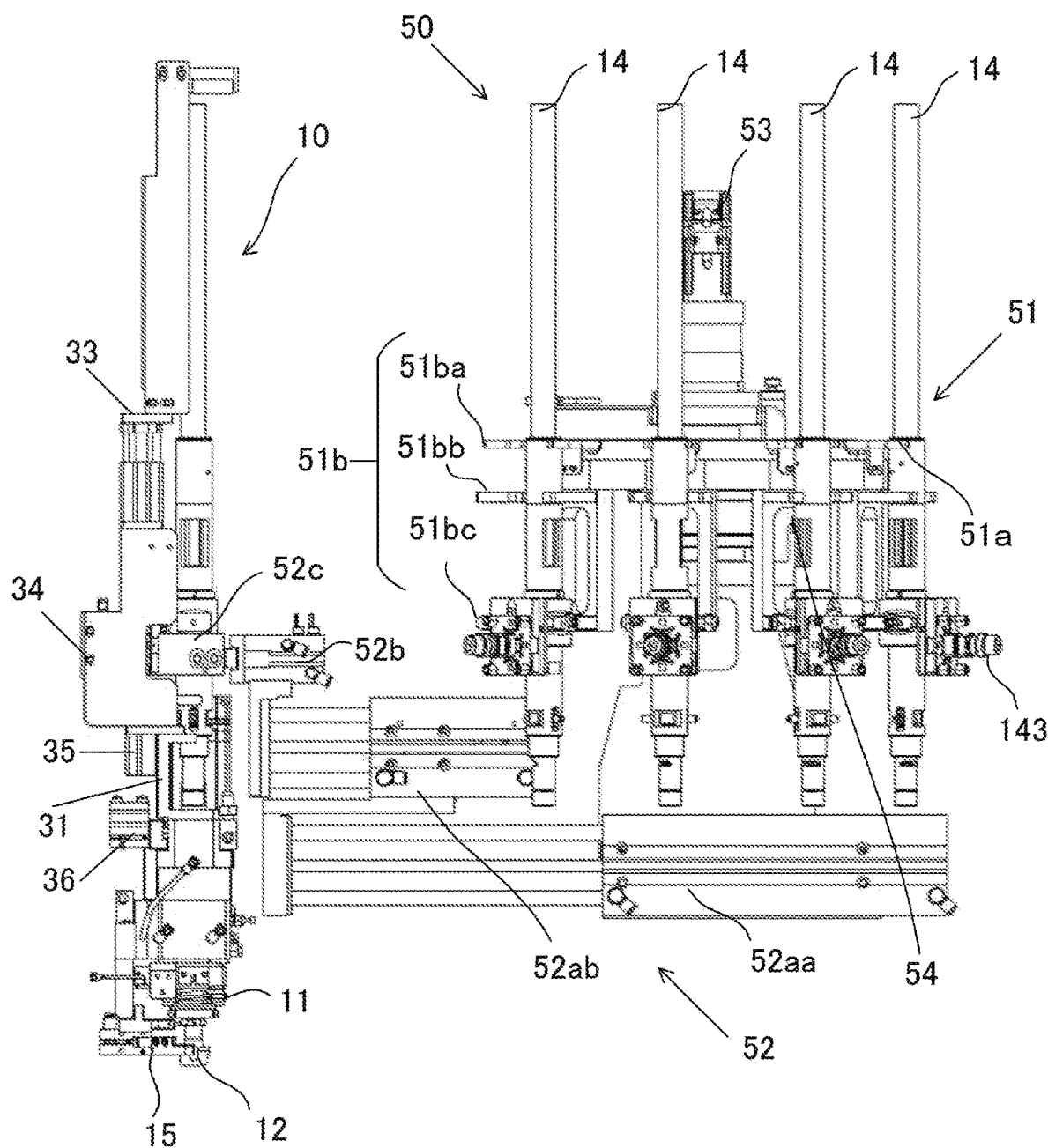
FIG. 2 is a schematic diagram showing a machining main spindle 10 and a first change device 50 of the embodiment.

Hereinafter, embodiments of the present invention will be described with reference to the drawings. FIG. 1 is a schematic diagram of the overall configuration of a fine hole electric discharge machine 100 of the present invention, and FIG. 2 is a schematic diagram showing a machining main spindle 10 and a first change device 50 of the embodiment.

The fine hole electric discharge machine 100 of the present invention includes a main body 40 of the fine hole electric discharge machine, the first change device 50 accommodating a plurality of automatic electrode supply devices 14, a second change device 60 accommodating a plurality of electrode holders 12, a third change device 70 accommodating a plurality of lower guides 17, and a control device 80 for overall control.

The main body 40 of the fine hole electric discharge machine includes a bed 1 placed on an installation surface, a saddle 2 installed on the bed 1 so as to reciprocate in a horizontal Y-axis direction, an X-axis arm 3 installed on this saddle 2 so as to reciprocate in a horizontal one-axis direction (X-axis) perpendicular to the Y-axis direction, and a machining head 8 installed at one end of the X-axis arm 3 so as to reciprocate in a vertical one-axis direction (W-axis) orthogonal to the X-axis and the Y-axis. The machining head 8 includes the machining main spindle 10, and the machining head 8 reciprocates in the X-axis direction and the Y-axis direction by the saddle 2 and the X-axis arm 3 which are not directly shown in FIG. 1.

The machining main spindle 10 is controlled to move up and down in a vertical one-axis direction (Z-axis) via the vertical one-axis (W-axis) orthogonal to the X-axis and the Y-axis and has a built-in rotating device including a rotary actuator, such as a motor. A second chuck 11 (FIG. 2) is attached to a tip (lower end) portion of the machining main spindle 10, and the electrode holder 12 (FIG. 2, FIG. 12) is detachably attached to the second chuck 11. An electrode 13 (FIG. 2, FIG. 6) is held by the electrode holder 12.

Further, a machining tank 4 is provided on the bed 1, and a workpiece 6 is placed on a support device (not shown) provided at the bottom of the machining tank 4.

A hollow cylindrical pipe electrode is used as the electrode 13. Machining is performed while supplying water-based or oil-based machining fluid at high pressure of up to 8 MPa through a hollow portion of the electrode 13 to an electric discharge gap at a tip opening.

The machining main spindle 10 includes a U-shaped bracket 31 into which the automatic electrode supply device 14 is inserted from the top, a cylinder 33 for sealing an upper portion of the automatic electrode supply device 14, a first chuck 34 for attaching the automatic electrode supply device 14 to the machining main spindle 10, a case pusher cylinder 35 (FIG. 2) for moving a delivery tube 142b of the automatic electrode supply device 14 up and down in the Z-axis direction (vertical direction), a sealing pusher cylinder 36 (FIG. 2) to prevent the machining fluid flowing inside the electrode 13 from leaking out to a side of an electrode cartridge 141, the second chuck 11 provided at the lower end portion of the machining main spindle 10, and a nut gripping device 15 arranged near the electrode holder 12.

The nut gripping device 15 is configured by attaching a locking claw to an openable actuator (hereinafter referred to as a hand chuck) operated by an air cylinder. When the machining main spindle 10 is rotated to cause the electrode holder 12 to hold or release the electrode 13, the hand chuck is operated to grip and fix a locknut 12e of the electrode holder 12 by hooking the locking claw into a locking groove. The electrode 13 is held or released by rotating a collet holder 12a together with the machining main spindle 10 to tighten or loosen the locknut 12e. The nut gripping device 15 constitutes an automatic electrode holding and releasing mechanism.

Figure 3:
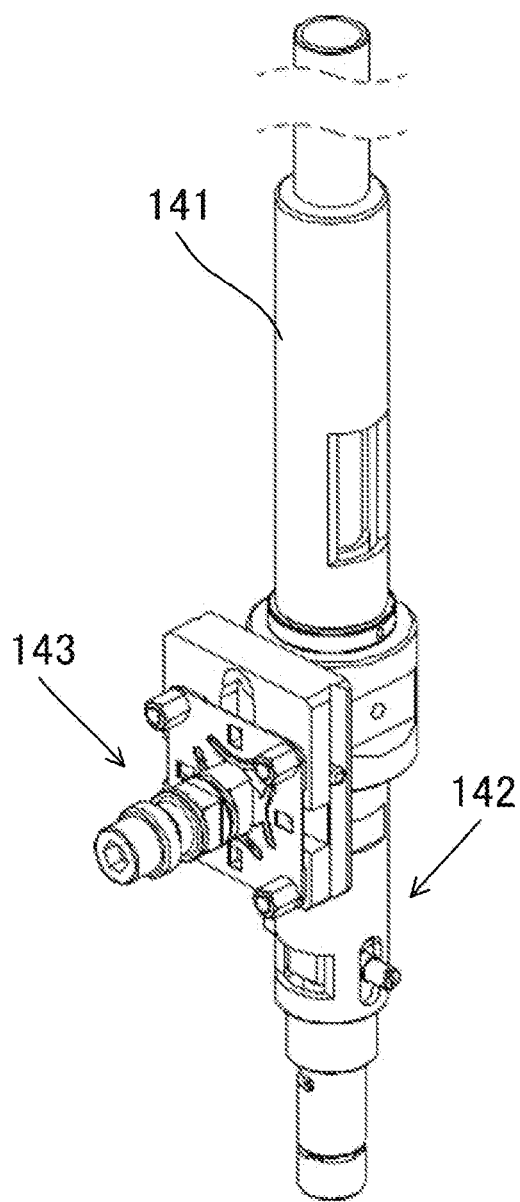
FIG. 3 is a perspective view showing an automatic electrode supply device 14 of the embodiment.
Figure 4:
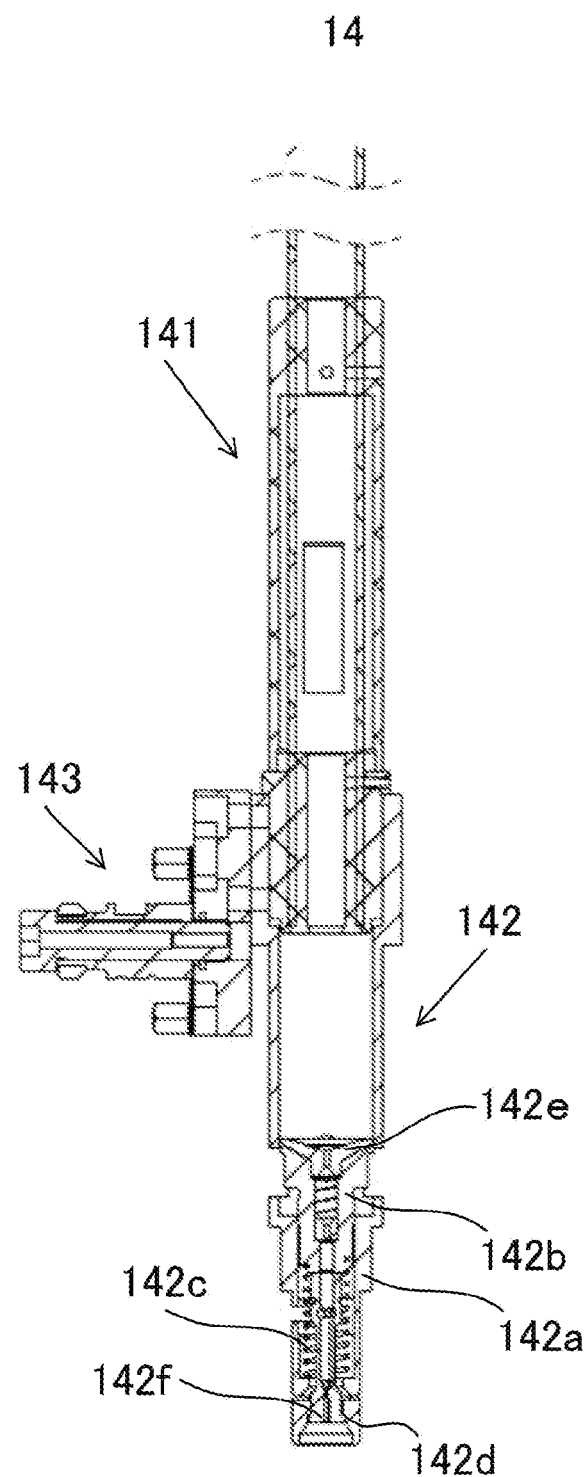
FIG. 4 is a cross-sectional view showing the internal structure of the automatic electrode supply device 14 of the embodiment.

FIG. 3 is a perspective view showing the automatic electrode supply device 14 of the embodiment. FIG. 4 is a cross-sectional view showing the internal structure of the automatic electrode supply device 14 of the embodiment.

The automatic electrode supply device 14 is detachably provided above the machining main spindle 10 and includes the electrode cartridge 141 storing a large number of electrodes 13 of the same diameter, an electrode feeder device 142 supplying the electrodes 13 one by one from the electrode cartridge 141 through the hollow portion of the machining main spindle 10 to the tip side, and an attachment portion 143 attached to the machining main spindle 10. It is possible to prepare one or more automatic electrode supply devices 14 storing the electrodes 13 of the same predetermined diameter in the electrode cartridge 141 and one or more automatic electrode supply devices 14 each storing the electrodes 13 of the diameter different from the predetermined diameter (the electrodes 13 of the same diameter are stocked in one automatic electrode supply devices 14). For example, when 10 automatic electrode supply devices 14 can be prepared, it is possible to prepare three automatic electrode supply devices 14 storing the electrodes 13 of φ0.5 mm, one automatic electrode supply device 14 storing the electrodes 13 of φ1.0 mm, two automatic electrode supply devices 14 storing the electrodes 13 of φ1.5 mm, and three automatic electrode supply devices 14 storing the electrodes 13 of φ2.0 mm.

The electrode feeder device 142 includes the delivery tube 142b housed in a housing 142a so as to be movable in the vertical direction, a cushion pad 142e provided at the top of the delivery tube 142b, a compression coil spring 142c pressing the delivery tube 142b upward, a lock ring 142d provided below the cylindrical housing 142a, and a notch 142f provided between the lock ring 142d and the compression coil spring 142c. The electrode cartridge 141 is attached to an upper portion of the housing 142a coaxially with the delivery tube 142b.

The case pusher cylinder 35 provided on a side of the machining main spindle 10 moves the delivery tube 142b in the Z-axis direction (vertical direction) to deliver the electrode 13 to the tip portion.

The notch 142f is a member with a hole formed in the center of a cross slit. When the delivery tube 142b is moved up, the hole is closed by tightening the notch 142f with the lock ring 142d to hold the electrode 13. When the delivery tube 142b is moved down, a tip of the notch 142f is released from the lock ring 142d, and the hole is opened to release the electrode 13.

The attachment portion 143 is a bar-shaped member to be detachably attached to the first chuck 34 provided on the machining main spindle 10.

Figure 12:
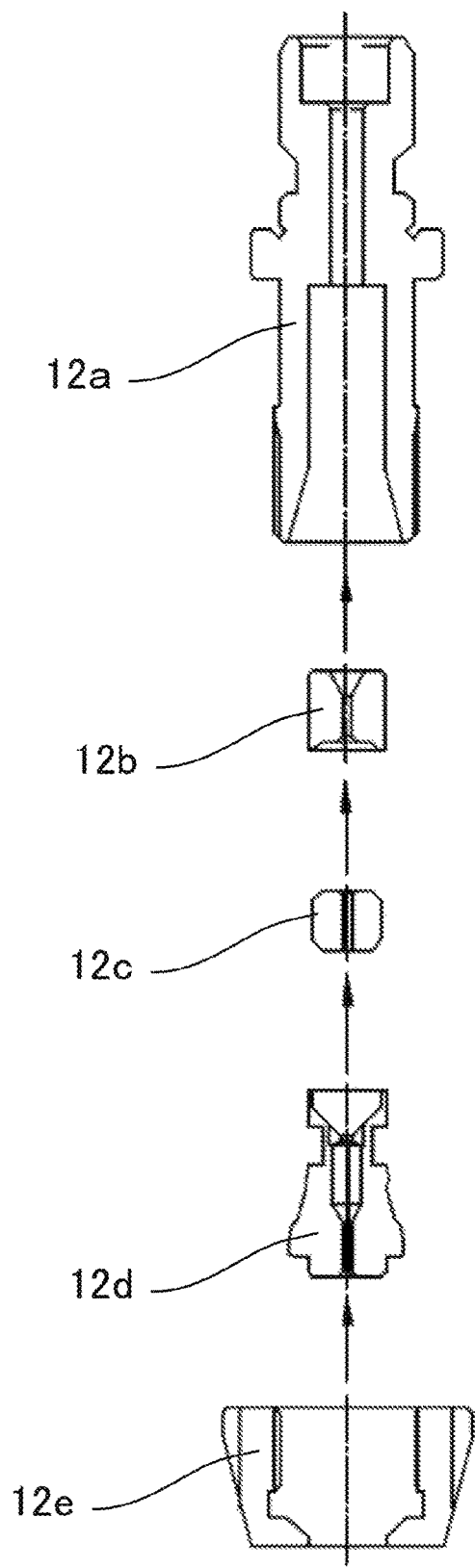
FIG. 12 is a schematic diagram showing an electrode holder 12 of the embodiment.

FIG. 12 is a schematic diagram showing the electrode holder 12 of the embodiment.

The electrode holder 12 is a member for holding the electrode 13 supplied to a tip side of the machining main spindle 10 by the automatic electrode supply device 14 and includes the collet holder 12a, a pipe guide 12b, a seal rubber 12c, a collet 12d, and the locknut 12e. A plurality of electrode holders 12 is prepared for different electrode diameters in a second magazine 191 of the second change device 60, and they are taken out from the second magazine 191 and changed according to the electrode diameter of the electrode used in the desired machining, similarly to the automatic electrode supply device 14.

By inserting the collet holder 12a into the second chuck 11, the electrode holder 12 can be detachably provided on the machining main spindle 10.

Figure 5:
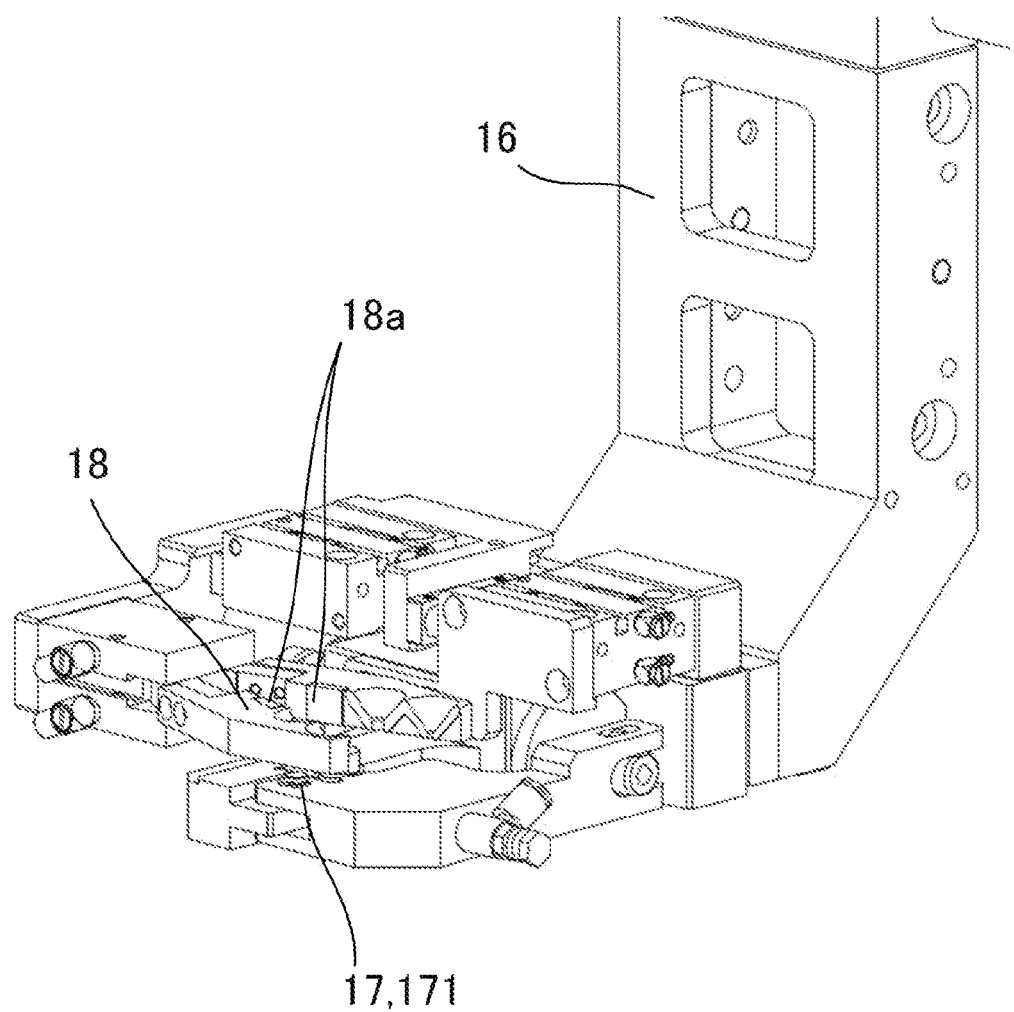
FIG. 5 is a schematic diagram showing a lower guide 17 and an electrode clamp device 18 of the embodiment.

FIG. 5 is a schematic diagram showing a lower guide 17 and an electrode clamp device 18 of the embodiment.

The lower guide 17 and an electrode clamp device 18 are attached to a tip of the machining head 8.

To prevent swing of the electrode 13, the lower guide 17 is placed at a lower guide attaching position 171 near an upper surface of the workpiece 6 during machining, and the electrode clamp device 18 including a small openable actuator and the like is arranged above the lower guide 17. The electrode clamp device 18 is provided with an electrode holding portion 18a formed of an elastic material, such as rubber, at a position where the electrode 13 is gripped.

When the electrode holder 12 holds a predetermined position of an upper end side of the electrode 13, the electrode 13 is temporarily fixed and supported by the electrode clamp device 18. Further, an intermediate guide for preventing the electrode 13 from swinging is provided as needed, above the lower guide 17.

Figure 6:
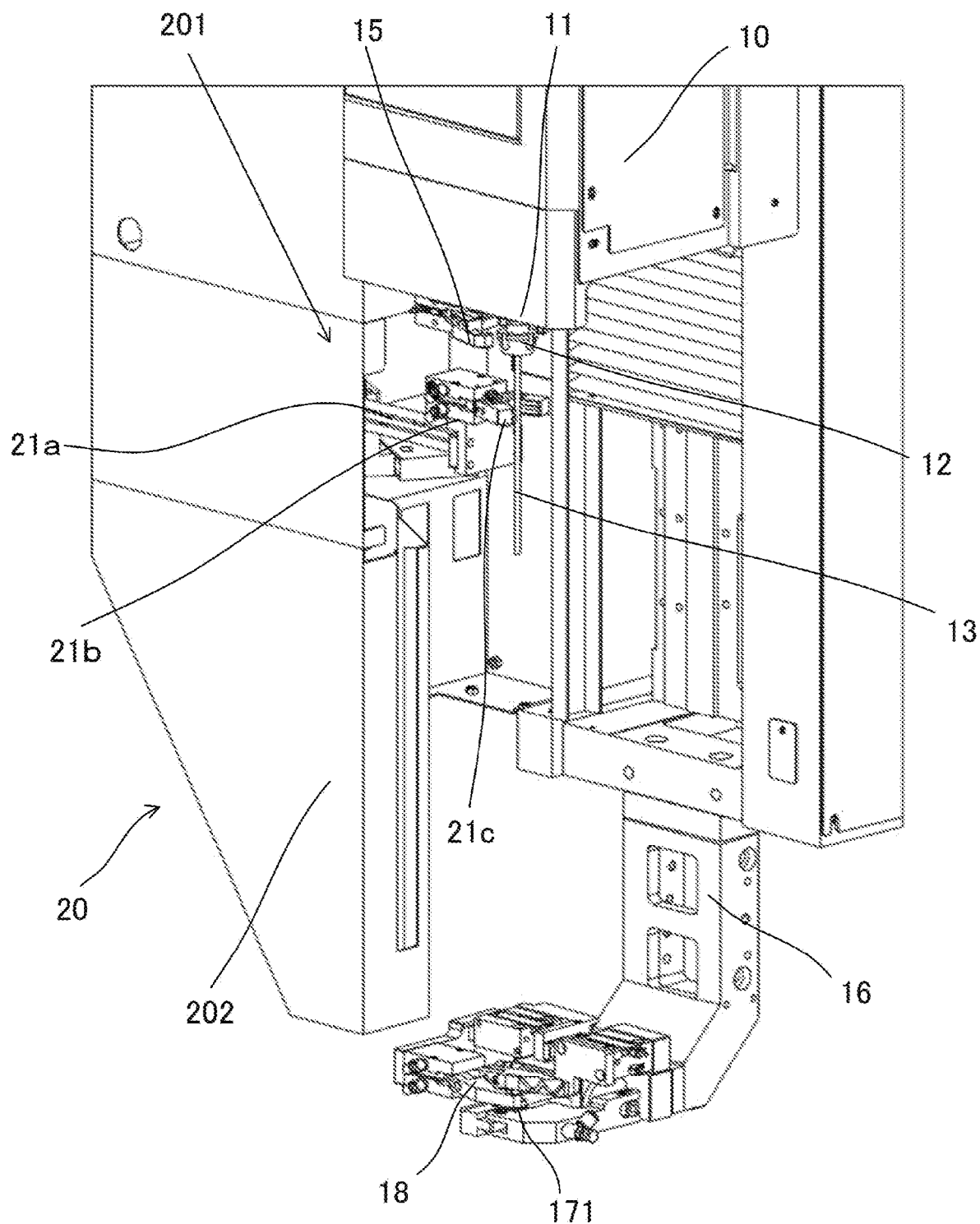
FIG. 6 is a schematic diagram showing a first electrode collecting device 20 of the embodiment.

FIG. 6 is a schematic diagram showing a first electrode collecting device 20 of the embodiment.

A first electrode collecting device 20 is attached below the machining head 8.

The first electrode collecting device 20 includes a first electrode transfer device 201 for collecting and transferring a used electrodes 13 that has been worn out in machining from the electrode holder 12 attached to the second chuck 11 and a first electrode collecting container 202 for accommodating the transferred electrode 13

The first electrode transfer device 201 includes a moving cylinder device (air cylinder) 21, an arm 21b attached to a tip of a rod 21a of the air cylinder 21, and a first electrode gripping device 21c attached to the arm 21b, and the first electrode gripping device 21c is advanced and retracted by the operation of the air cylinder 21. The first electrode gripping device 21c has an electrode gripping claw having flat contact surfaces for gripping the electrode 13 when the claw is closed.

The first electrode collecting container 202 for collecting and accommodating the worn-out electrode is provided below the first electrode transfer device 201.

The first electrode gripping device 21c is moved forward by the operation of the air cylinder 21 and grips the used electrode 13 attached to the electrode holder 12 mounted on the second chuck 11. Then, the electrode 13 is taken out from the electrode holder 12, and the gripping claw of the first electrode gripping device 21c is opened, so that the electrode 13 is dropped and stored in the first electrode collecting container 202.

(1. 2 Configuration of First Change Device 50)

Figure 7:
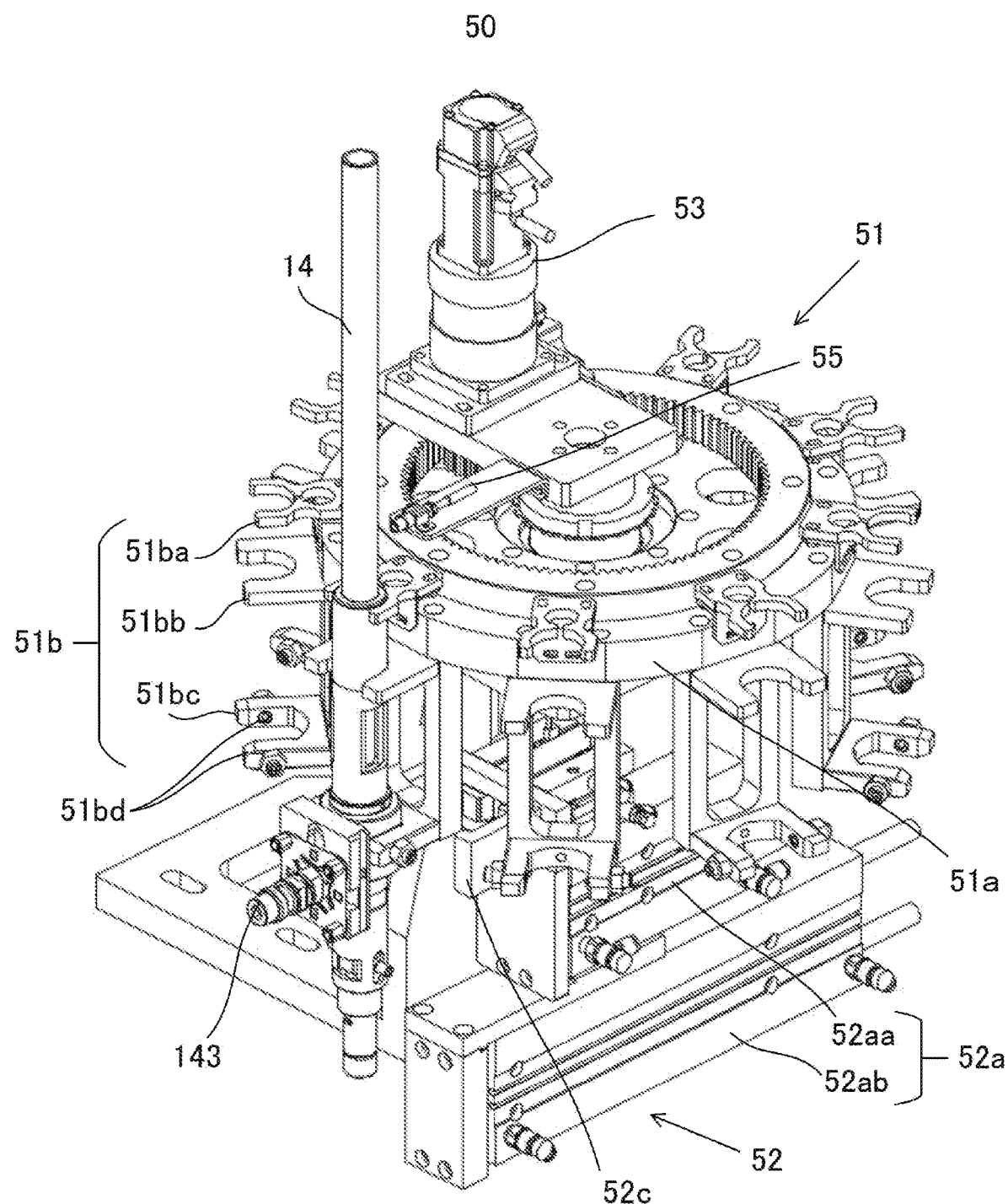
FIG. 7 is a schematic diagram showing an example of an aspect in which the automatic electrode supply device 14 of the embodiment is attached to a first change device 50.

FIG. 7 is a schematic diagram showing an example of an aspect in which the automatic electrode supply device 14 of the embodiment is attached to the first change device 50.

Figure 8:
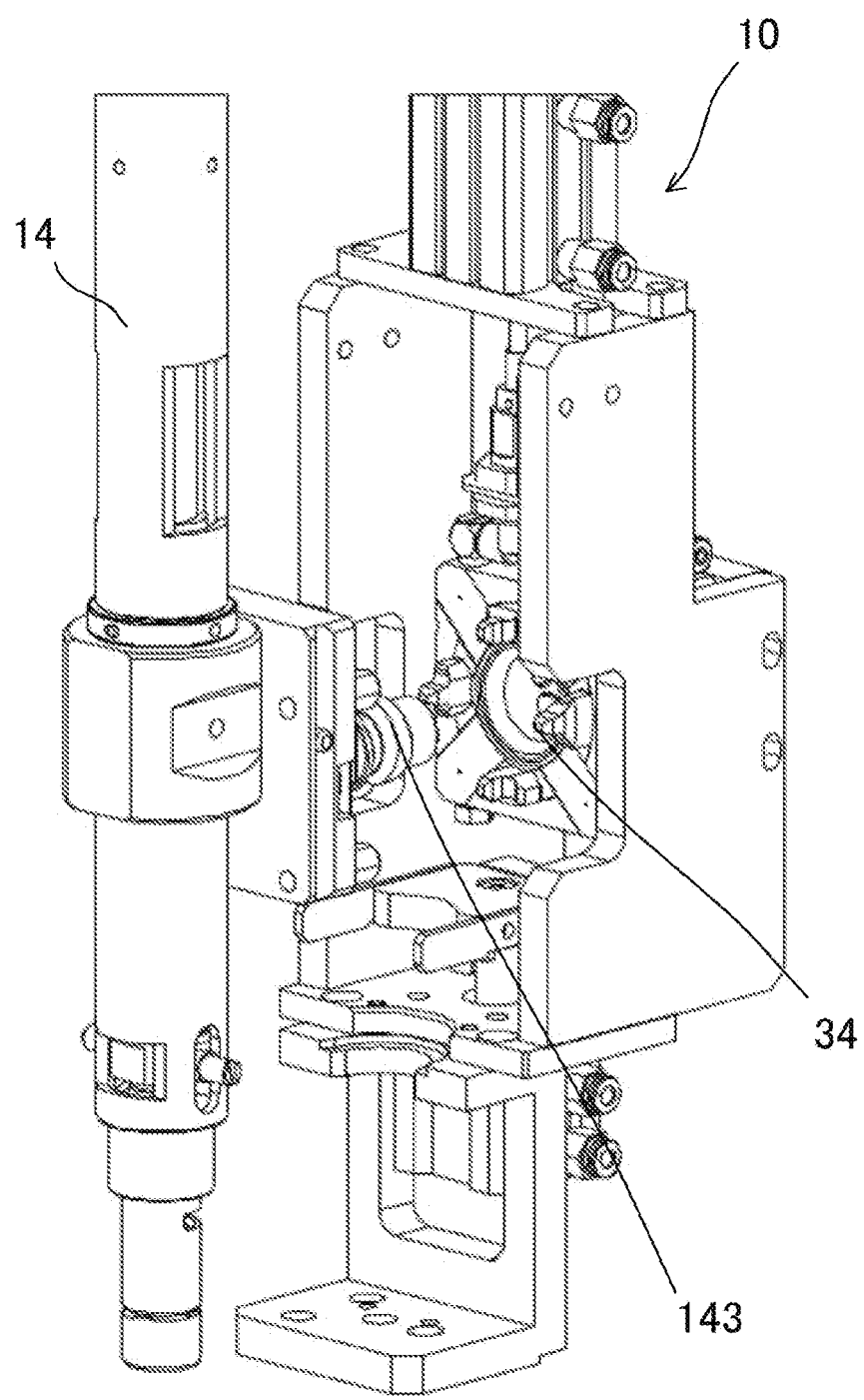
FIG. 8 is a schematic diagram showing an example of an aspect in which the automatic electrode supply device 14 of the embodiment is attached to a first chuck 34.

FIG. 8 is a schematic diagram showing an example of an aspect in which the automatic electrode supply device 14 of the embodiment is attached to the first chuck 34.

The first change device 50 is configured to accommodate a plurality of automatic electrode supply devices 14 and to attach and detach the automatic electrode supply device 14 to and from the main body 40 of the fine hole electric discharge machine. The first change device 50 is mounted on the bed 1 near a side of the machining head 8.

The first change device 50 includes a first magazine 51 that accommodates, in an individually detachable manner, the automatic electrode supply devices 14, 14, . . . storing the electrodes of different diameters, a first transfer device 52 that transfers the automatic electrode supply device 14 between the first magazine 51 and the first chuck 34, a driving device 53 that rotationally drives the first magazine 51, an origin sensor 54 that is provided on a lower side of the first magazine 51 to reduce rattling and misalignment when the first magazine 51 is rotated, and a change position sensor 55 that detects a change position of the automatic electrode supply device 14.

The first magazine 51 includes a circular magazine table 51a that is controlled to indexably rotate, and a large number of accommodation members 51b arranged at predetermined intervals on the outer circumference of the magazine table 51a.

The accommodation member 51b includes three concave members, that is, an upper accommodation member 51ba, a central accommodation member 51bb, and a lower accommodation member 51bc each having a U-shape opening radially outward and provided on the outer circumference of the first magazine 51 in parallel in the Z-axis direction.

The upper accommodation member 51ba, the central accommodation member 51bb, and the lower accommodation member 51bc accommodate and support the automatic electrode supply device 14 in each U-shaped concave portion.

The upper accommodation member 51ba is a member to prevent the automatic electrode supply device 14 from tilting in a pitch direction and is formed of a material, such as polyacetal.

Ball plungers 51bd are arranged on the lower accommodation member 51bc to hold the automatic electrode supply device 14 from both sides to prevent it from falling off, and the automatic electrode supply device 14 is fixed by engaging the ball plunger 51bd with a groove provided on a side surface of the automatic electrode supply device 14.

In this way, the upper accommodation member 51ba prevents the automatic electrode supply device 14 from tilting, and the lower accommodation member 51bc positions the automatic electrode supply device 14 in the Z-axis direction.

The first transfer device 52 is configured to move the automatic electrode supply device 14. The first transfer device 52 includes a two-stage cylinder device 52a provided below the magazine table 51a, an arm 52b (FIG. 2) attached to a tip of an upper cylinder 52aa, and a gripping device 52c (FIG. 2) attached to the arm 52b and is driven by the cylinder device 52a to advance and retract.

The cylinder device 52a includes two linear cylinders, that is, the upper cylinder 52aa and a lower cylinder 52ab. The upper cylinder 52aa and the lower cylinder 52ab are arranged to be vertically overlapped in the Z-axis direction.

The upper cylinder 52aa and the lower cylinder 52ab are connected to each other, and the upper cylinder 52aa and the lower cylinder 52ab are extended and contracted in cooperation with each other to transfer the automatic electrode supply device 14 between the accommodation member 51b of the first magazine 51 and the first chuck 34.

The cylinder device 52a can take three positions, that is, a retreat position in which the upper cylinder 52aa and the lower cylinder 52ab are contracted, a change position in which the upper cylinder 52aa is extended and the lower cylinder 52ab is contracted, and an attachment position in which the upper cylinder 52aa and the lower cylinder 52ab are extended.

When the cylinder device 52a is in the retreat position, the gripping device 52c is arranged in a position below the magazine table 51a so as not to interfere with other components. When the cylinder device 52a is in the change position, the gripping device 52c is positioned to grip the automatic electrode supply device 14 accommodated in the magazine table 51a. Further, when the cylinder device 52a is in the attachment position, the gripping device 52c is positioned to attach the automatic electrode supply device 14 to the first chuck 34.

The gripping device 52c is a gripping device for the automatic electrode supply device 14 and configured by attaching a gripping claw for gripping the automatic electrode supply device 14 to a hand chuck.

The driving device 53 is configured to rotationally drive the magazine table 51a and specifically, is a rotary motor.
(1. 3 Configuration of Second Change Device 60)

Figure 9:
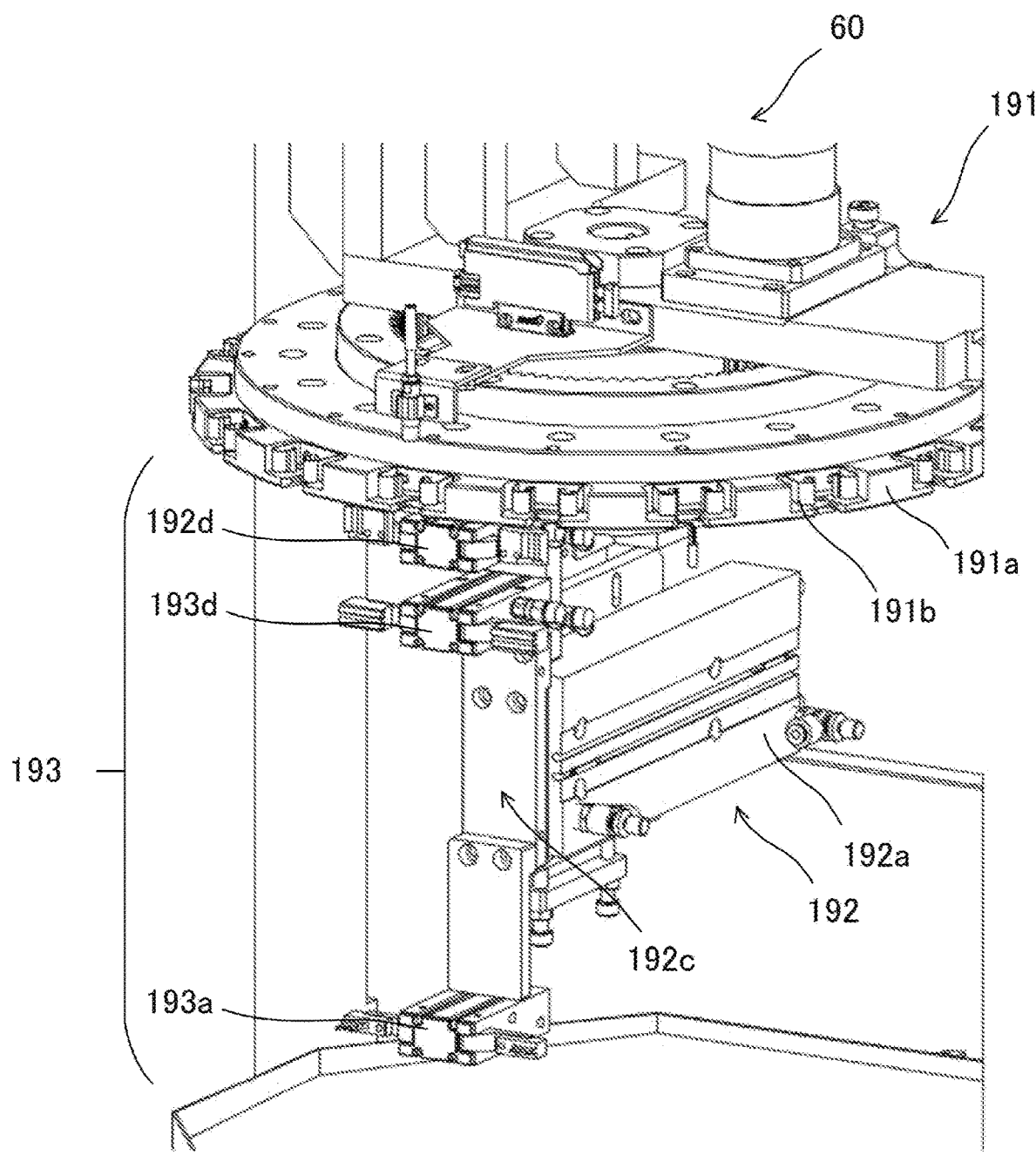
FIG. 9 is a first schematic diagram showing a second change device 60 and a second electrode collecting device 193 of the embodiment.
Figure 10:
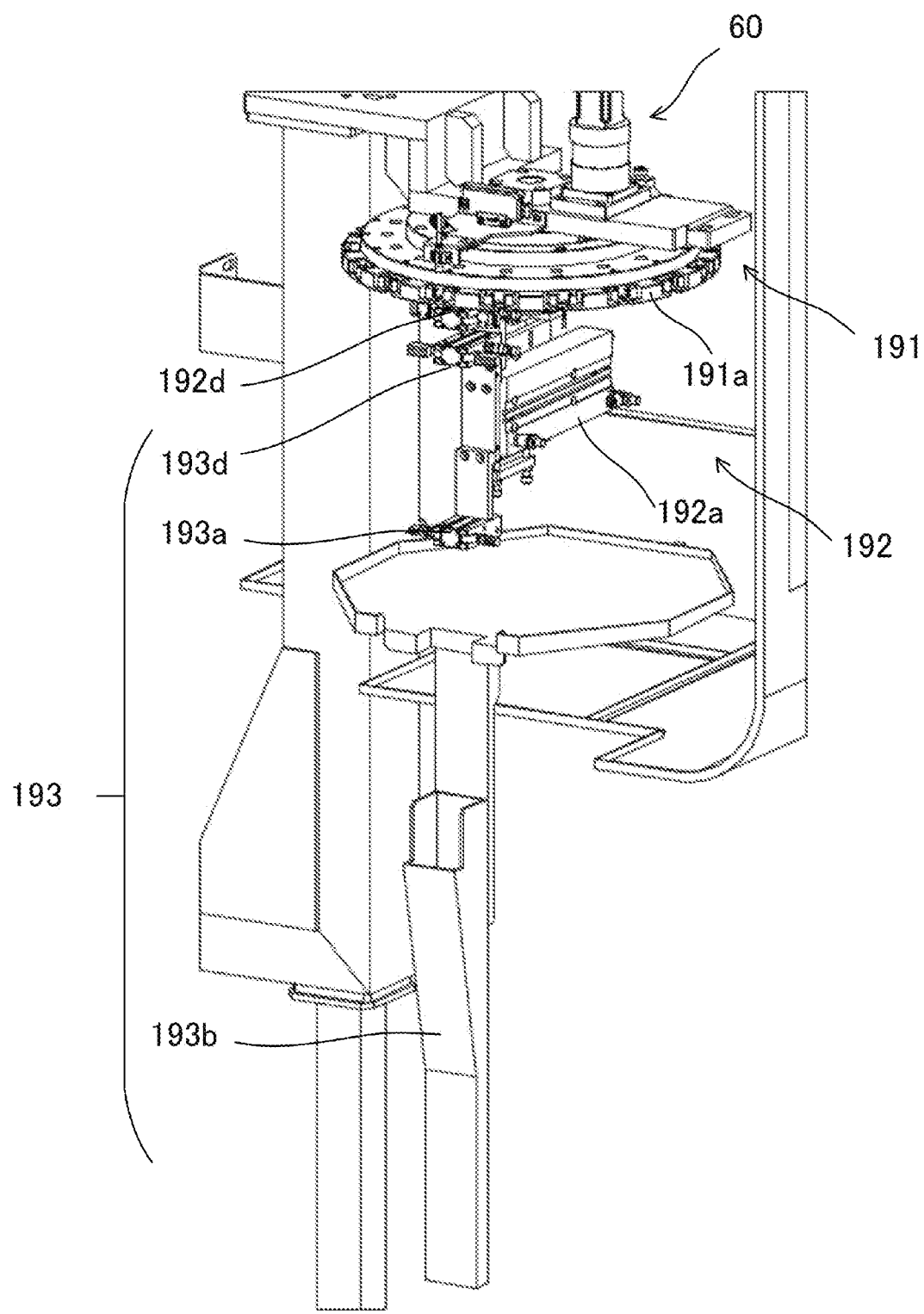
FIG. 10 is a second schematic diagram showing the second change device 60 and the second electrode collecting device 193 of the embodiment.

FIG. 9 and FIG. 10 are schematic diagrams showing the second change device 60 and a second electrode collecting device 193 of the embodiment.

The second change device 60 is configured to accommodate a plurality of electrode holders 12 corresponding to different electrode diameters and to attach and detach the electrode holder 12 to and from the main body 40 of the fine hole electric discharge machine. The second change device 60 is mounted on the bed 1 below the first change device 50.

The second change device 60 includes the second magazine 191 that accommodates a plurality of electrode holders 12, 12, . . . corresponding to different electrode diameters in an individually detachable manner and a second transfer device 192 that transfers the electrode holder 12 between the second magazine 191 and the second chuck 11.

The second magazine 191 includes a circular magazine table 191a that is controlled to indexably rotate and a large number of accommodation members 191b arranged at predetermined intervals on the outer circumference of the magazine table 191a. Each of the large number of accommodation members 191b has a U-shape opening outward in a radial direction of the magazine table 191a, and the electrode holder 12 is accommodated and supported in the U-shaped concave portion. A plate spring or the like is arranged to surround the U-shaped concave portion to prevent the electrode holder 12 from falling off.

The second transfer device 192 is configured to move the electrode holder 12 and includes a moving cylinder device (air cylinder) 192a provided below the magazine table 191a, an arm 192c provided at a tip of a rod 192b (not shown) of the air cylinder 192a, and a gripping device 192d attached to the arm 192c. The electrode holder 12 is advanced and retracted by the operation of the air cylinder 192a.

The gripping device 192d is a gripping device for the electrode holder and configured by attaching an electrode holder gripping claw having a concave portion for gripping the electrode holder 12 when the claw is closed, to a hand chuck.

The second electrode collecting device 193 includes a swing prevention device 193a and a second electrode gripping device 193d as a second electrode transfer device and a second electrode collecting container 193b for accommodating the transferred electrode 13 and is provided below the second change device 60. The second electrode collecting device 193 is used when the electrode 13 that is not yet worn out and has an electrode length of a predetermined value or more is replaced with a new electrode 13 of a different diameter, and it is useful for collecting the electrode 13 that cannot be collected by the first electrode collecting device 20.

The second electrode gripping device 193d is configured by attaching an electrode gripping claw having flat contact surfaces for gripping the electrode 13 when the claw is closed, to a hand chuck. The second electrode gripping device 193d is provided on the arm 192c below the gripping device 192d in conjunction with the gripping device 192d and is advanced and retracted by the operation of the air cylinder 192a.

The swing prevention device 193a is configured to grip the electrode 13 so that the worn-out electrode 13 can securely enter the second electrode collecting container 193b and is a gripping device configured by attaching an electrode gripping claw having flat contact surfaces for gripping the electrode 13 when the claw is closed, to a hand chuck, which is similar to the second electrode gripping device 193d. The swing prevention device 193a is provided on the arm 192c below the second electrode gripping device 193d in conjunction with the gripping device 192d and the second electrode gripping device 193d and is advanced and retracted by the operation of the air cylinder 192a.

As described above, the gripping device 192d, the second electrode gripping device 193d, and the swing prevention device 193a share the air cylinder 192a.

The second electrode collecting container 193b is provided below the swing prevention device 193a to collect and store the worn-out electrode.
(1. 4 Configuration of Third Change Device 70)

Figure 11:
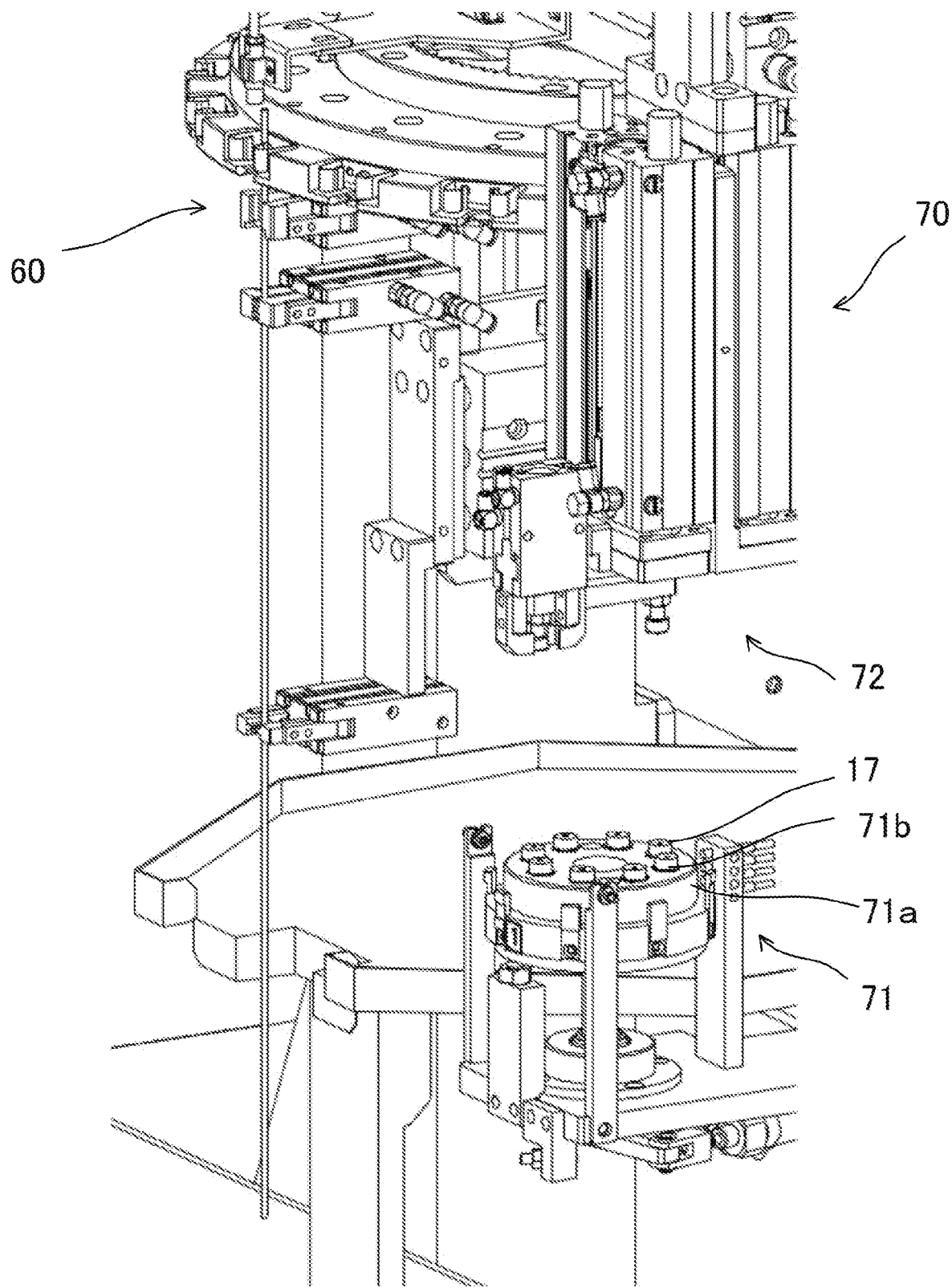
FIG. 11 is a schematic diagram showing a third change device 70 of the embodiment.

FIG. 11 is a schematic diagram showing the third change device 70 of the embodiment.

The third change device 70 is configured to accommodate a plurality of lower guides 17 corresponding to different electrode diameters and to attach and detach the lower guide 17 to and from the main body 40 of the fine hole electric discharge machine. The third change device 70 is mounted on the bed 1 below the second change device 60.

The third change device 70 includes a third magazine 71 that accommodates a plurality of lower guides 17, 17, . . . corresponding to different electrode diameters in an individually detachable manner and a third transfer device 72 that transfers the lower guide 17 between the third magazine 71 and the lower guide attaching position 171.

The third magazine 71 includes a circular magazine table 71a that is controlled to indexably rotate and a large number of accommodation holes 71b arranged at predetermined intervals on the outer circumference of the table 71a. A plurality of lower guides 17 is accommodated in the accommodation holes 71b.

The third transfer device 72 is configured to move the lower guide 17, and for example, a known LGC device, such as a robot hand, is used.

The third transfer device 72 moves down from above the magazine the table 71a to grip the lower guide 17 accommodated in the accommodation hole 71b and then moves up. Then, the third transfer device 72 moves horizontally to the lower guide attaching position 171 and performs the operation of attaching the lower guide 17 to the lower guide attaching position 171.

(2. 1 Overall Flow of Changing Electrodes of Different Diameters)

An electrode change method of the present embodiment will be described below.

When machining is performed using the electrodes 13 of different diameters, a discharging step (S1) of discharging the electrode 13 from the electrode holder 12, changing steps (S2, S3) of changing the lower guides 17 and the electrode holders 12, a changing step (S4) of changing the automatic electrode supply devices 14, and an electrode insertion step (S5) of inserting a new electrode 13 into the changed electrode holder 12 are sequentially performed. Each step will be described below.

(2. 2 Flow of Discharging Step (S1))

In the discharging step (S1), the length of electrodes that can be discharged by the first electrode collecting device 20 is limited due to the device structure. When the electrode 13 is further replaced with an electrode 13 of a different diameter in a short time after the previous replacement, the electrode 13 having a length larger than a predetermined value may be attached to the electrode holder 12, and there may arise a problem that the first electrode collecting device 20 cannot collect the electrode 13.

Therefore, if the length of the electrode 13 attached to the machining main spindle is smaller than the predetermined value, the electrode 13 is discharged by the first electrode collecting device 20, and if the length of the electrode 13 is larger than the predetermined value, the electrode 13 is discharged by the second electrode collecting device 193.

First, the control device 80 measures the length of the electrode 13 attached to the machining main spindle 10 (S101). Specifically, the length of the electrode 13 after machining is measured by moving the machining main spindle 10 in the Z-axis direction (vertical direction) and bringing a tip of the electrode 13 into contact with the upper surface of the workpiece 6.

If the length of the electrode 13 after machining is equal to or less than a reference value, the machining main spindle 10 is moved to an electrode change position, and the air cylinder 21 of the first electrode collecting device 20 is operated to advance the first electrode gripping device 21c below the second chuck 11 (S102-1). The first electrode gripping device 21c grips the electrode 13 attached to the electrode holder 12 mounted on the second chuck 11 (S103-1). Next, the electrode 13 is pulled out from the electrode holder 12 by releasing the electrode 13 from the gripping by the electrode holder 12 and moving up the machining main spindle 10 to an electrode change preparation position (S104-1). Then, the air cylinder 21 is operated, and the first electrode gripping device 21c gripping the electrode 13 is retracted (S105-1). Finally, the electrode gripping claws of the first electrode gripping device 21c is opened, and the electrode 13 is dropped and accommodated into the first electrode collecting container 202 (S106-1).

If the length of the electrode 13 after machining is larger than the reference value, the machining main spindle 10 is moved to the electrode change position, and the second magazine 191 is rotated so that the accommodation member 191b in which the electrode holder 12 is not accommodated is located above the second electrode collecting device 193 (electrode discharge position) (S102-2). Then, the air cylinder 192a is operated to advance the second electrode gripping device 193d and the swing prevention device 193a below the second chuck 11 (S103-2). Then, the second electrode gripping device 193d grips the electrode 13 attached to the electrode holder 12 mounted on the second chuck 11 (S104-2). The electrode 13 is then pulled out from the electrode holder 12 by releasing the electrode 13 from the gripping by the electrode holder 12 and moving up the machining main spindle 10 to the electrode change preparation position (S105-2). Next, the electrode gripping claw of the swing prevention device 193a is closed and grips a lower portion of the electrode 13 to stop the vibration of the electrode 13 (S106-2). The air cylinder 192a is then operated to retract the second electrode gripping device 193d gripping the electrode 13 and the swing prevention device 193a (S107-2). Finally, after waiting for a certain period of time until the vibration of the electrode 13 is stopped, the electrode gripping claws of the second electrode gripping device 193d and the swing prevention device 193a are opened respectively, and the electrode 13 is dropped and accommodated into the second electrode collecting container 193b (S108-2).

As described above, in the discharging step, it is possible to discharge the electrode 13 suitably without depending on the length of the electrode 13 attached to the electrode holder 12 on the machining main spindle 10.

(2. 3 Flow of Changing Step (S2) of Lower Guide 17)

Next, the operation of changing the lower guides 17 will be described.

The lower guides 17 are changed by the third change device 70. As basically in the same manner as in the prior art, after detaching the lower guide 17 that has been used, another lower guide 17 to be used for the next machining is attached.

A plurality of lower guides 17 corresponding to electrode diameters required for fine hole electric discharge machining is accommodated in the accommodation hole 71b of the third magazine 71 in advance by an operator. A plurality of the lower guides 17 corresponding to electrodes of different diameters is accommodated in the third magazine 71.

In the detaching operation of the lower guide 17, the control device 80 first drives the third transfer device 72 to move it to the lower guide attaching position 171, and the lower guide 17 attached to the lower guide attaching position 171 is gripped by a gripping member, such as a robot hand (S201). Next, by moving up the third transfer device 72 gripping the lower guide 17, the lower guide 17 is detached from the lower guide attaching position 171 (S202). Then, the third transfer device 72 is moved above the accommodation hole 71b of the third magazine 71 in which the lower guide 17 is not accommodated, and the lower guide 17 is released from the gripped state to accommodate it in the accommodation hole 71b (S203).

In the attaching operation of the lower guide 17, the third transfer device 72 is first moved above the lower guide 17 to be used for machining to grip the lower guide 17 (S204). Finally, the third transfer device 72 gripping the lower guide 17 is moved above the lower guide attaching position 171, and the lower guide 17 is released from the gripped state, so that the lower guide 17 is attached to the lower guide attaching position 171 (S205).

In this way, the lower guide 17 is detached from the lower guide attaching position 171, and the lower guide 17 corresponding to the diameter of the electrode is attached.

(2. 4 Flow of Changing Step (S3) of Electrode Holder 12)

Next, the operation of changing the electrode holders 12 will be described.

The electrode holders 12 are changed by the second change device 60. As basically in the same manner as in the prior art, after detaching the electrode holder 12 that has been used, another electrode holder 12 to be used for the next machining is attached.

The electrode 13 of the diameter required for fine hole electric discharge machining is held in the electrode holders 12, and a plurality of electrode holders 12 is accommodated in the accommodation member 191*b* of the second magazine 191 in advance by the operator. A plurality of electrode holders 12 holding the electrodes of different diameters is accommodated in the second magazine 191.

In the detaching operation of the electrode holder 12, the control device 80 first positions the machining main spindle 10 at the electrode holder change position and then advances the gripping device 192*d* and closes the gripping claw to grip the electrode holder (S301). Next, the electrode holder 12 is detached from the second chuck 11 (S302), and the machining main spindle 10 is moved up to an electrode holder change preparation position (S303). Then, the gripping device 192*d* is retracted, and the electrode holder 12 is transferred to the accommodation member 191*b* of the second change device 60 (S304).

In the attaching operation of the electrode holder 12, the control device 80 first rotates the magazine table 191*a*, the electrode holder 12 holding the electrode 13 to be used for machining is moved above the gripping device 192*d* (S305). Next, the gripping device 192*d* closes the gripping claw to grip the electrode holder 12 and is advanced by the operation of the air cylinder 192*a* to transfer it directly under the second chuck 11 (S306). Then, the control device 80 moves down the machining main spindle 10 that is already positioned at the electrode holder change preparation position to the electrode holder change position, so that the electrode holder 12 is attached to the second chuck 11 (S307).

In this way, the electrode holder 12 is detached from the machining main spindle 10, and a new electrode holder 12 is attached.

(2. 5 Flow of Changing Step (S4) of Automatic Electrode Supply Device 14)

Next, the operation of changing the automatic electrode supply devices 14 will be described.

The automatic electrode supply devices 14 are changed by the first change device 50. After detaching the automatic electrode supply device 14 that has been used, another automatic electrode supply device 14 accommodating the electrodes 13 to be used for the next machining is attached.

The automatic electrode supply device 14 storing the electrodes 13 of the diameters required for fine hole electric discharge machining is accommodated in the accommodation member 51*b* of the first magazine 51 in advance by the operator. A plurality of automatic electrode supply devices 14 storing the electrodes of different diameters is accommodated in the first magazine 51.

In the detaching operation of the automatic electrode supply device 14, the control device 80 first moves the machining main spindle 10 to an automatic electrode supply device change position (S401). Next, the magazine table 51*a* is rotated by the operation of the change position sensor 55 and the driving device 53 so as to arrange the accommodation member 51*b* in which automatic electrode supply device 14 is not accommodated at the change position (S402). Then, the control device 80 drives the upper cylinder 52*aa* and the lower cylinder 52*ab* to extend the upper cylinder 52*aa* and the lower cylinder 52*ab* and advances the gripping device 52*c* to an attachment position near the first chuck 34 (S403). The automatic electrode supply device 14 mounted on the first chuck 34 of the machining main spindle 10 is then gripped from its side surface by closing the gripping claw of the gripping device 52*c* (S404). Next, the lower cylinder 52*ab* is contracted to retract the gripping device 52*c* gripping the automatic electrode supply device 14, and the automatic electrode supply device 14 is detached from the first chuck 34 (S405). As the lower cylinder 52*ab* contracts, the detached automatic electrode supply device 14 is moved from the first chuck 34 to the change position of the magazine table 51*a* (S406). Then, the automatic electrode supply device 14 is accommodated and supported in the concave portions of the upper accommodation member 51*ba*, the central accommodation member 51*bb*, and the lower accommodation member 51*bc* (S407). The automatic electrode supply device 14 is securely supported and prevented from falling off by the ball plungers 51*bd* provided on the lower accommodation member 51*bc*. Finally, the upper cylinder 52*aa* is contracted to move the first transfer device 52 to the retreat position (S408).

The diameter of the electrode 13 stored in the automatic electrode supply device 14 accommodated in the first magazine 51 is registered in advance in the control device 80.

In the attaching operation of the automatic electrode supply device 14, the control device 80 first rotates the magazine table 51*a* by the operation of the change position sensor 55 and the driving device 53 so as to arrange the automatic electrode supply device 14 storing the electrode 13 of the diameter for replacement at the change position (S408). Then, the control device 80 drives the upper cylinder 52*aa* and extends the upper cylinder 52*aa* to advance the gripping device 52*c* to the change position (S409). The gripping claw of the gripping device 52*c* is then closed to grip the automatic electrode supply device 14 at the change position of the magazine table 51*a* from its side surface (S410). Next, the lower cylinder 52*ab* is extended to advance the gripping device 52*c* gripping the automatic electrode supply device 14 to the attachment position, and the automatic electrode supply device 14 is attached to the machining main spindle 10 by inserting the attachment portion 143 into the first chuck 34 (S411). Finally, the upper cylinder 52*aa* and the lower cylinder 52*ab* are contracted to move the first transfer device 52 to the retreat position (S412).

In this way, the automatic electrode supply device 14 is detached from the machining main spindle 10, and a new automatic electrode supply device 14 is attached.

(2. 6 Flow of Electrode Insertion Step (S5))

Figure 13A:
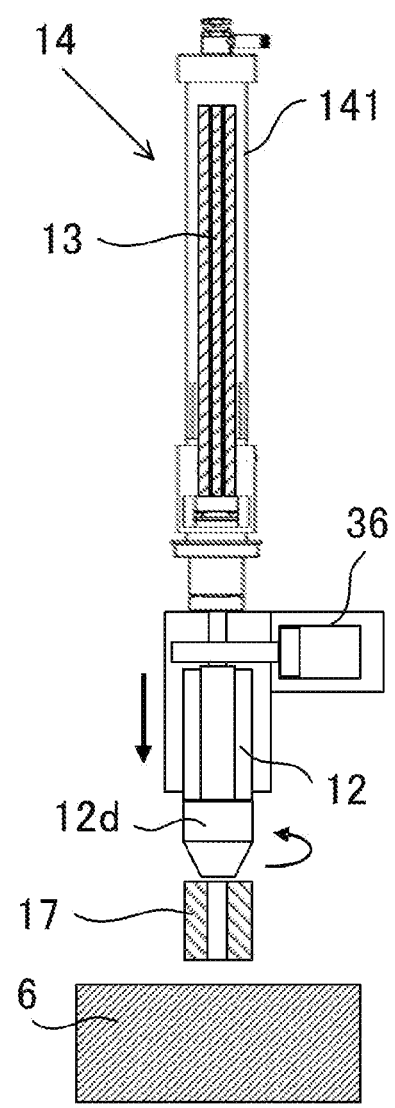
FIG. 13A is a first schematic diagram illustrating an electrode insertion step (S5) of the embodiment.
Figure 13B:
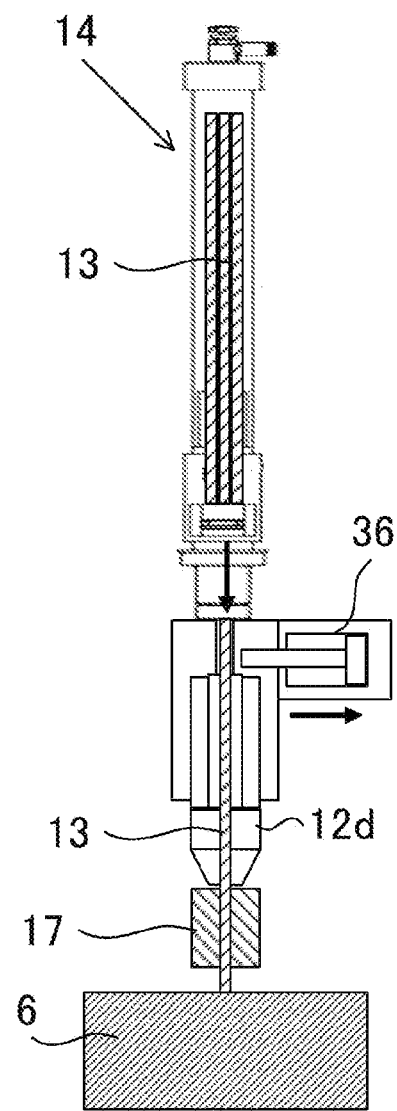
FIG. 13B is a second schematic diagram illustrating the electrode insertion step (S5) of the embodiment.
Figure 13C:
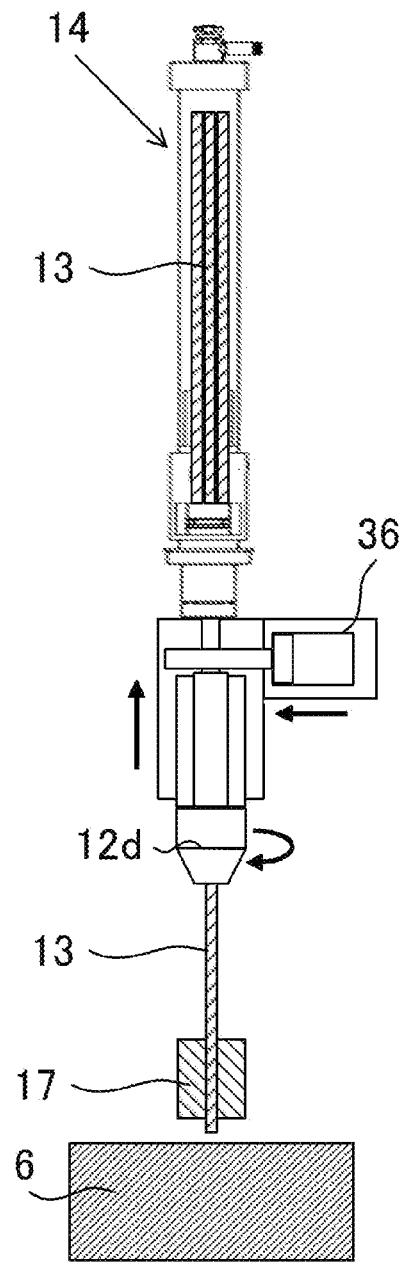
FIG. 13C is a third schematic diagram illustrating the electrode insertion step (S5) of the embodiment.

FIG. 13A to FIG. 13C are schematic diagrams for describing the electrode insertion step (S5) of the embodiment. With reference to FIG. 13A to FIG. 13C, the operation in the electrode insertion step (S5) will be described.

First, the machining head 8 is moved in the W-axis direction, and the machining head 8 is positioned so that the lower guide 17 and the upper surface of the workpiece 6 are spaced by about several millimeters (S501). Then, the electrode clamp device 18 is driven to move the electrode holding portion 18*a* to a position where the electrode 13 can be held (S502) (FIG. 13A).

Next, the nut gripping device 15 is driven to grip and fix the locknut 12*e* of the electrode holder 12 (S503). Then, the collet 12*d* is rotated by rotating the machining main spindle 10 to loosen the locknut 12*e* (S504) (FIG. 13A).

Further, the machining main spindle 10 is moved in the Z-axis direction, and the machining main spindle 10 is positioned so that the electrode holder 12 can be placed at a close position above the electrode clamp device 18 (S505) (FIG. 13A).

The sealing pusher cylinder 36 is then driven to open a hollow portion of the machining main spindle 10 (S506). The delivery tube 142b of the automatic electrode supply device 14 is moved in the Z-axis direction by moving the case pusher cylinder 35 in the Z-axis direction (vertical direction), and the electrode 13 is sent from the electrode cartridge 141 through the hollow portion of the machining main spindle 10 to its tip side (S507) (FIG. 13B).

Then, the movement of the case pusher cylinder 35 is stopped when the tip of the electrode 13 moves below the lower guide 17 and it is detected that the tip of the electrode 13 comes into contact with the upper surface of the workpiece 6 (S508). The electrode clamp device 18 is driven so that the electrode holding portion 18a can grip the electrode 13 (S509).

Then, the machining main spindle 10 is moved up to a predetermined position in the Z-axis direction, and the case pusher cylinder 35 and the sealing pusher cylinder 36 are closed at the predetermined position (S510). The locknut 12e of the electrode holder 12 is then gripped and fixed by the nut gripping device 15. The collet 12d is rotated by rotating the machining main spindle 10 backward to tighten the locknut 12e, and the electrode 13 is fixed to the electrode holder 12 (S511) (FIG. 13C).

Finally, the electrode clamp device 18 is driven to release the electrode 13 (S512), and the machining main spindle 10 is moved up in the Z-axis direction to move to a machining position (S513).

Other Embodiments

Although the fine hole electric discharge machine 100 of the present invention includes the first change device 50, the second change device 60, and the third change device 70, the second change device 60 and the third change device 70 may not be provided.

Further, the electrode holders 12 may be accommodated in the second change device 60 or changed while holding the electrodes 13, or such operations may be performed in a state the electrode holders 12 do not hold the electrodes 13.

In addition, although the fine hole electric discharge machine 100 of the present invention includes the first electrode collecting device 20 and the second electrode collecting device 193, it is possible to use only one of them, or a device integrating the functions of the first electrode collecting device 20 and the second electrode collecting device 193 may be used.

REFERENCE SIGNS LIST 10 machining main spindle
11 second chuck
12 electrode holder
13 electrode
14 automatic electrode supply device
141 electrode cartridge
142 electrode feeder device
15 nut gripping device
17 lower guide
171 lower guide attaching position
18 electrode clamp device
191 second magazine
193 second electrode collecting device
20 first electrode collecting device
34 first chuck
50 first change device
51 first magazine
52 first transfer device
60 second change device
70 third change device
71 third magazine
72 third transfer device
100 fine hole electric discharge machine

The invention claimed is:

1. A fine hole electric discharge machine, comprising a first change device, a second change device, a first electrode collecting device and a second electrode collecting device, wherein the first change device, comprising:
automatic electrode supply devices each comprising an electrode cartridge storing a plurality of electrodes of a predetermined diameter and an electrode feeder device supplying the electrodes one by one from the electrode cartridge;
wherein the electrode feeder device includes a delivery tube housed in a housing so as to be movable in the vertical direction, a cushion pad provided at the top of the delivery tube, a compression coil spring pressing the delivery tube upward, a lock ring provided below the housing, and a notch provided between the lock ring and the compression coil spring;
wherein the electrode cartridge is attached to an upper portion of the housing coaxially with the delivery tube;
the electrode is delivered from the electrode cartridge by a case pusher cylinder provided on a side of machining main spindle, which moves the delivery tube in the vertical direction;
a first magazine accommodating, in a detachable manner, the automatic electrode supply devices storing the electrodes of different diameters; and
a first transfer device configured to transfer the automatic electrode supply devices from the first magazine to a fine hole electric discharge machine;
wherein the first magazine comprises a circular magazine table that is controlled to indexably rotate and a plurality of accommodation members arranged at predetermined intervals on an outer circumference of the magazine table;
each of the accommodation members comprises an upper accommodation member, a central accommodation member, and a lower accommodation member;
the upper accommodation member, the central accommodation member, and the lower accommodation member are vertically aligned and each have a concave portion supporting the automatic electrode supply devices;
wherein the upper accommodation member is a member to prevent the automatic electrode supply device from tilting in a pitch direction;
wherein the lower accommodation member comprises ball plungers, the ball plungers engage a groove provided on a side surface of the automatic electrode supply device; and
each of the automatic electrode supply devices is fixed by engaging with the lower accommodation member,
wherein the second change device comprises a second magazine accommodating electrode holders in a detachable manner and a second transfer device configured to transfer the electrode holders between the second magazine and a second chuck provided on a tip portion of a machining main spindle, and
the second magazine accommodates a plurality of electrode holders holding the electrodes of different diameters, wherein the first electrode collecting device is provided below a position of a machining head during machining; and the second electrode collecting device is provided below the second change device and collects the electrode having an electrode length of a predetermined value or more.

2. The fine hole electric discharge machine of claim 1, further comprising a third change device, wherein the third change device comprises a third magazine accommodating lower guides in a detachable manner and a third transfer device configured to transfer the lower guides between the third magazine and a lower guide attaching position located below the machining main spindle, and the third magazine accommodates a plurality of lower guides corresponding to different electrode diameters.

* * * * *